(12) United States Patent
De Grooth et al.

(10) Patent No.: US 11,020,712 B2
(45) Date of Patent: Jun. 1, 2021

(54) POLYELECTROLYTE MULTILAYER (PEM) MEMBRANES AND THEIR USE

(71) Applicant: NX Filtration Holding B.V., Enschede (NL)

(72) Inventors: Joris De Grooth, Enschede (NL); Maria Gerridina Elshof, Enschede (NL); Hendrik Dirk Willem Roesink, Hertme (NL)

(73) Assignee: NX Filtration Holding B.V., Enschede (NL)

( * ) Notice: Subject to any disclaimer, the term of this patent is extended or adjusted under 35 U.S.C. 154(b) by 0 days.

(21) Appl. No.: 16/613,727

(22) PCT Filed: May 5, 2017

(86) PCT No.: PCT/EP2017/060822
§ 371 (c)(1),
(2) Date: Nov. 14, 2019

(87) PCT Pub. No.: WO2018/202317
PCT Pub. Date: Nov. 8, 2018

(65) Prior Publication Data
US 2020/0164320 A1    May 28, 2020

(51) Int. Cl.
*B01D 71/68* (2006.01)
*B01D 69/02* (2006.01)
(Continued)

(52) U.S. Cl.
CPC ............ *B01D 71/68* (2013.01); *B01D 69/02* (2013.01); *B01D 71/58* (2013.01); *C02F 1/442* (2013.01);
(Continued)

(58) Field of Classification Search
CPC .. C02F 1/44; C02F 1/441; C02F 1/442; C02F 1/444; B01D 69/02; B01D 67/0088; B01D 61/427
See application file for complete search history.

(56) References Cited

U.S. PATENT DOCUMENTS 8,567,611 B2 * 10/2013 Cheng ................. D04H 1/4382
                                                    210/490
2004/0149572 A1    8/2004 Schlenoff et al.
(Continued)

FOREIGN PATENT DOCUMENTS

WO    WO2016127212 A1    8/2016

OTHER PUBLICATIONS

Ng et al., A review on nanofiltration membrane fabrication and modification using polyelectrolytes: effective ways to develop membrane selective barriers and rejection capability, Adv Colloid Interface Sci. Sep. 2013;197-198:85-107.
(Continued)

*Primary Examiner* — Ellen M McAvoy
(74) *Attorney, Agent, or Firm* — Michael J. Blessent; Bret E. Field; Bozicevic, Field & Francis LLP (57) ABSTRACT

The present invention relates to a polyelectrolyte multilayer (PEM) membrane comprised of at least one bilayer, wherein the bilayer is comprised of a layer of a polymeric polycation and a layer of a polymeric polyanion. Furthermore, present invention relates to methods for the production of these PEM membranes by layer-by-layer deposition and the use of these PEM membranes for the decontamination of liquids, preferably water.

20 Claims, 8 Drawing Sheets

(51) Int. Cl.
 *B01D 71/58* (2006.01)
 *C02F 1/44* (2006.01)
(52) U.S. Cl.
 CPC ...... *B01D 2325/14* (2013.01); *B01D 2325/16* (2013.01)

(56) References Cited

U.S. PATENT DOCUMENTS

| | | |
|---|---|---|
| 2008/0179188 A1 | 7/2008 | Nelson et al. |
| 2015/0353381 A1* | 12/2015 | Rodrigues ................ C08K 3/22 210/660 |
| 2018/0036687 A1* | 2/2018 | Hill ........................... C02F 1/44 |
| 2018/0326359 A1* | 11/2018 | Fokema ................. B01D 71/28 |

OTHER PUBLICATIONS

Shan et al., Polyelectrolyte multilayer films as backflushable nanofiltration membranes with tunable hydrophilicity and surface charge, Journal of Membrane Science, vol. 349, Issues 1-2, Mar. 1, 2010, pp. 268-278.

* cited by examiner

Figure 1

Poly (allylamine hydrochloride) (PAH)

Poly (ethyleneimine) Linear (PEI(L))

Copolymer of 2-propen-1-amine-hydrochloride with N-2-propenyl-2-propen-1-amine-hydrochloride (CPPAHC)

Poly (diallyl methyl amine hydrochloride) (PDAMAHC)

Poly (diallyldimethylammonium chloride) (PDADMAC)

Poly (ethyleneimine) Branched (PEI)

Poly (diallyldimethylammonium chloride-co-sulfone) (SPDADMAC)

Figure 2

Poly (styrene sulfonate) (PSS)

Poly (vinylsulfonic acid sodium salt) (PVS)

Polyacrylic acid (PAA)

POLYELECTROLYTE MULTILAYER (PEM) MEMBRANES AND THEIR USE

The present invention relates to a polyelectrolyte multilayer (PEM) membrane comprised of at least one bilayer, wherein the bilayer is comprised of a layer of a polymeric polycation and a layer of a polymeric polyanion. Furthermore, present invention relates to methods for the production of these PEM membranes by layer-by-layer deposition and the use of these PEM membranes for the decontamination of liquids, preferably water.

Access to clean drinking water is considered as a basic privilege in the world. However, more than a billion of people around the world still lack access to clean drinking water. There is a growing need for methods to also ensure clean drinking water. After the successful development of treatment methods based on porous membranes (e.g., ultrafiltration (UF)) that are designed to remove harmful yet mainly macroscopic sized contaminants such as bacteria, cryptosporidium, and viruses, the development of the next generation membranes for water treatment is essential. Due to the industrial development and urbanization, water sources are contaminated more and more and need to be removed from the water in order to ensure good quality drinking water. The past few decades, the concentration of industrial chemicals, hormones, pesticides, antibiotics and Endocrine Disrupting Chemicals (EDCs) in water has increased. These emerging contaminants, also called micropolutants (MPs), are industrial, medicinal and agricultural wastes such as nonylphenols, sulfamethoxazole, atenolol and atrazine. They are characteristically small, with molecular weights ranging between 100 and 1,000 Da, and have the potential to cause long-term harm to humans and the environment.

However, the current water purification methods based on adsorption (e.g. carbon adsorption), oxidation or membrane filtration are not sufficient anymore due to the increased small organic contaminants (such as micropollutants). Because of their small size, conventional membrane filtration with relatively large pores, such as UF and microfiltration (MF), is not sufficient for their removal. Furthermore, using adsorption techniques, non-polar compounds are retained at higher levels than polar compounds. Some small organic contaminants are very resistant to be removed to a desired level using conventional physicochemical and biological treatment methods. A disadvantage of the oxidation processes is that small organic contaminants are not completely mineralized and that undesired by-products are formed.

When using membranes for water purification, the idea is that the contaminants are rejected by the membrane while water passes. However, current ultrafiltration membranes are not designed to remove these small organic contaminants and also nanofiltration membranes with a much lower molecular weight cut-off are not able to remove these pollutions sufficiently. Therefore, there is a need for better techniques which are able to remove small organic contaminants or lower their concentration in e.g. drinking water.

To remove e.g. pesticides, herbicides or medicines, nanofiltration (NF) membranes are being used. For chemically stable NF membranes, dense layers of polyelectrolytes, i.e. sulfonated poly(ether ether ketone) (SPEEK) are coated, typically on top of polyethersulfone (PES) supports. Other methods of obtaining dense NF membranes can be based on interfacial polymerization, where a crosslinked polymeric network of 50-500 nm is formed on top of a porous support. Although these membranes have good nanofiltration properties, the approaches have the major drawback that for the synthesis of these NF membranes, organic, often toxic, solvents and/or chemical reactions are used that partly degrade the support needed for the membrane. In order to obtain a separation membrane with both a high flux and selectivity, it is required to develop an ultra-thin defect-free separation membrane on top of a highly permeable and mechanically robust support without the use of toxic solvents or reactants and the need for an additional pre-treatment step.

Polyelectrolytes are polymers whose repeating units bear an electrolyte group. Polycations and polyanions are polyelectrolytes. Polyelectrolytes have been utilized in the formation of new types of materials known as polyelectrolyte multilayers (PEMs). These thin films are constructed using a layer-by-layer (LbL) deposition technique without the use of toxic solvents and/or chemical reactions that adversely affect membrane production. In LbL assembly, a substrate is alternatively exposed to polycations and polyanions, to produce PEMs. During LbL deposition, a suitable growth substrate (usually charged) is dipped back and forth between dilute baths of positively and negatively charged polyelectrolyte solutions. During each dip a small amount of polyelectrolyte is adsorbed, allowing the gradual and controlled build-up of electrostatically crosslinked films of polycation-polyanion layers. Thickness control of such films may be down to the single-nanometer scale.

During LbL deposition, when a negatively charged substrate is exposed to a solution with an oppositely charged polycation, a charge overcompensation by the polycation flips the charge of the substrate. As a result no more polycation can adsorb. The obtained surface can now readily adsorb a polyanion from a solution and the process is successfully repeated, thus allowing the consecutive growth of multilayers with a controllable thickness. The versatility of this approach allows the PEMs to be grown on a multitude of substrates, thus also allowing its use for the development of NF membranes. By changing e.g., pH, ionic strength, type of polyelectrolyte or the number of coating steps the thickness, density and charge of the membrane can be changed.

However the number of layers and more importantly the type of polyelectrolyte layers of PEM modified membranes are important properties of NF membranes, since the last polyelectrolyte layer, also known as the terminating layer, can affect the properties of the PEM. Ending with a polycation will result in a more positive charge throughout the PEM, whereas ending with a polyanion results in a more negative charge. The changes observed depending on the different terminating layers are referred to as odd-even effects. The most obvious odd-even effect is the flipping of the charge of the PEM from negative to positive, e.g. from a negative poly(styrene sulfonate) (PSS) terminated layer to a positive poly(diallyldimethylammoniumchloride) (PDADMAC) terminated layer.

Changing the nanofiltration membrane charge by changing the terminating layer can have a considerable effect on the seperation properties. For example, the above mentioned odd-even effects are also observed in respect to water mobility, contact angle and swelling degree (hydration) of the polyelectrolyte layer. Although excellent NF membranes comprising layers of PDADMAC can be produced by the LbL method, it has the major drawback that layers with PDADMAC and a polyanion tend to have more polycations than polyanions. As a result the bulk of the membrane layer is positively charged and therefore behaves as a polycation. This results in that the NF membrane swells tremendously in water, hydrating the membrane and increasing the space between the polymers, adversely affecting the filter properties to filter and retain the solutes, due to the more open structure, increased pore size, a lower resistance and decreased filter properties.

Considering the above, there is a need in the art for improved membranes for the removal of small organic contaminants (such as micropollutants) from liquids, preferably water. These membranes should have an improved retention and permselectivity, without adversely affecting the permeability of the membrane. Furthermore the so called "swelling" or hydration of the membrane during the filtration process needs to be reduced in order to improve the filtering process.

It is an object of the present invention, amongst other objects, to address the above need in the art. The object of present invention, amongst other objects, is met by the present invention as outlined in the appended claims.

Specifically, the above object, amongst other objects, is met, according to a first aspect, by the present invention by a polyelectrolyte multilayer (PEM) membrane for the filtration of liquids, for example water, wherein the membrane is comprised of at least one bilayer, wherein the at least one bilayer is comprised of a layer of a polymeric polycation and a layer of a polymeric polyanion, wherein hydration of the PEM membrane when contacted with the liquids is reduced through covalent incorporation of functional groups in said polymeric polycation or in said polymeric polyanion, in comparison to a PEM membrane that does not comprise incorporation of functional groups in said polymeric polycation or said polymeric polyanion. Preferably the PEM membranes are used to filter water. Hydration of the PEM membrane can be defined as the take up of water by the polyelectrolyte multilayer. The "swelling degree" or hydration of the polyelectrolyte multilayer will be lowered because of the charge density is lowered and the hydrophobicity is increased of said polymeric polycation or polymeric polyanion through covalent incorporation of functional groups in said polymeric polycation or said polymeric polyanion. The influence of different polyelectrolytes having incorporated functional groups with respect to their charge density and hydrophobicity is studied. The charge density is defined as the number of ion pairs per mass of the repeating unit of the polymeric polycation or polyanion.

The PEM membranes of present invention can be porous, tubular, fibres supports, wherein the supports are comprised of polymer or ceramic material. The supports are coated, using the LbL deposition technique, with at least a layer of a polymeric polycation and at least a layer of a polymeric polyanion and wherein the polymeric polycation or polymeric polyanion has covalently incorporated functional groups, such as sulfone.

Surprisingly, it was found that that overcompensation of charge within the polyelectrolyte layer can be adjusted (e.g. reduced) by adding functional groups, "non-charged moieties", to the backbone of the polycation or polyanion. These non-charged moieties may be functional groups that have a neutral charge, and therefore do not add additional charge to the polycation or polyanion polymer. The non-charged-moieties are (repeating) groups linked or crafted to the polymer backbone that do not dissociate in water. One example of such a non charged moiety is sulfone. Sulfone is a chemical compound containing a sulfonyl functional group attached to two carbon atoms, $R—S(=O)2-R'$ where R and R' are organic groups. In the present invention the R and R' groups are polycation monomers, e.g. DADMAC. Poly (diallyldimethylammonium chloride-co-sulfone (SPDADMAC) has incorporated a sulfone group in the monomer backbone whereas PDADMAC does not. By addition of the sulfone into the backbone of the polycation, additional mass is added to the repeating unit without the addition of extra charge. Therefore the charge density of the SPDADMAC as compared to PDADMAC is lowered and the hydrophobicity will increase by the addition of the sulfone group. By adding a sulfone, the overcompensation effect within the polyelectrolyte layer can be reduced, thereby reducing the swelling of the PEM and resulting in an improvement of the membrane's performance, i.e. permselectivity, without adversely affecting the permeability of the membrane.

Permselectivity is the restriction of permeation of macromolecules across membrane barrier on the basis of molecular size, charge, and physical configuration. For the PEM membrane the permselectivity is described as the water permeability over the salt permeability (L/B); the permselectivity for the PEM membrane can be obtained by dividing the water permeability by the salt permeability. The membranes of present invention outperform the membranes without having sulfone (i.e. the standard PDADMAC based membranes) by almost a factor of 10, when comparing their permselectivity. In the case of PDADMAC and SPDADMAC, a roughly identical permeability results in a much higher permselectivity for SPDADMAC (about 10 $bar^{-1}$). It therefore can be concluded that a lower charge per monomer as in the case of SPDADMAC and therewith less overcompensation of charge within the layer and less swelling as observed with PDADMAC, results in an improvement of the membrane performance without giving up on the permeability.

According to a preferred embodiment, the present invention relates to the PEM membrane, wherein the functional groups are selected from the group of sulfone, vinylpyrrolidone, styrene, preferably sulfone. Vinylpyrrolidone is also known as 1-ethenylpyrrolidin-2-one or N-vinyl-2-pyrrolidone. Styrene is also known as ethenylbenzene or vinylbenzene. The non-charged moieties have a neutral charge. The non-charged-moieties are (repeating) groups linked to the polymer backbone that do not dissociate in water. Other examples of non-charged moiety that may be used are (poly)ethylene, (poly)propylene, (poly)ethylene oxide, (poly)phenylene oxide, (poly)formaldehyde, (poly)acrylonitrile, (poly)vinyl alcohol, (poly)acrylamide, cellulose, (poly) saccharides, (poly)vinyl chloride, (poly)methyl methacrylate and/or para-methoxyamphetamine.

To influence the performance, the charge density and hydrophobicity of polyelectrolytes on the PEM membrane performance, several combinations of polyelectrolytes (polyanion-polycation) can be used. Examples of polyelectrolyte combinations that may be used in the present invention are poly(acrylamide-co-diallyldimethylammonium chloride) or polyamine sulfones.

According to another preferred embodiment, the present invention relates to the PEM membrane, wherein the polycation is an amine based polycation selected from the group consisting of poly(diallyldimethylammonium chloride) (PDADMAC), Poly(acrylamide-co-diallyldimethylammonium chloride) (PDADMAC/AM), poly(allylamine hydrochloride) (PAH), poly(ethyleneimine) (PEI), poly(diallyl methyl amine hydrochloride) (PDAMAHC), and a copolymer of 2-propen-1-amine-hydrochloride with N-2-propenyl-2-propen-1-aminehydrochloride (CPPAHC), preferably poly(diallyldimethylammonium chloride). Different amine based polycations (positively charged polyelectrolytes) can be distinguished by their degree of substitution; primary ($NH_2R$), secondary ($NHR_2$), tertiary ($NR_3$), and quaternary ($NR_4^+$) amine polycations. With increasing degree of substitution, the following polycations (FIG. 1) may be used for the production of a PEM membrane; PAH<CPPAHC<PEI<PDAMAHC<PDADMAC. Out of these different amine based polycations, the quaternary substituted polycations are the most interesting for stable membranes, because their charge is independent on pH and they cannot be oxidized, meaning that they are stable in oxidising environments such as in hypochlorite solutions, which is often present as decontaminant in water or used to clean fouled membranes. Therefore quaternary substituted polycation such as Poly(vinyl benzyl trimethylammonium chloride), PDADMAC and derivatives thereof are most preferred.

Figure 2:
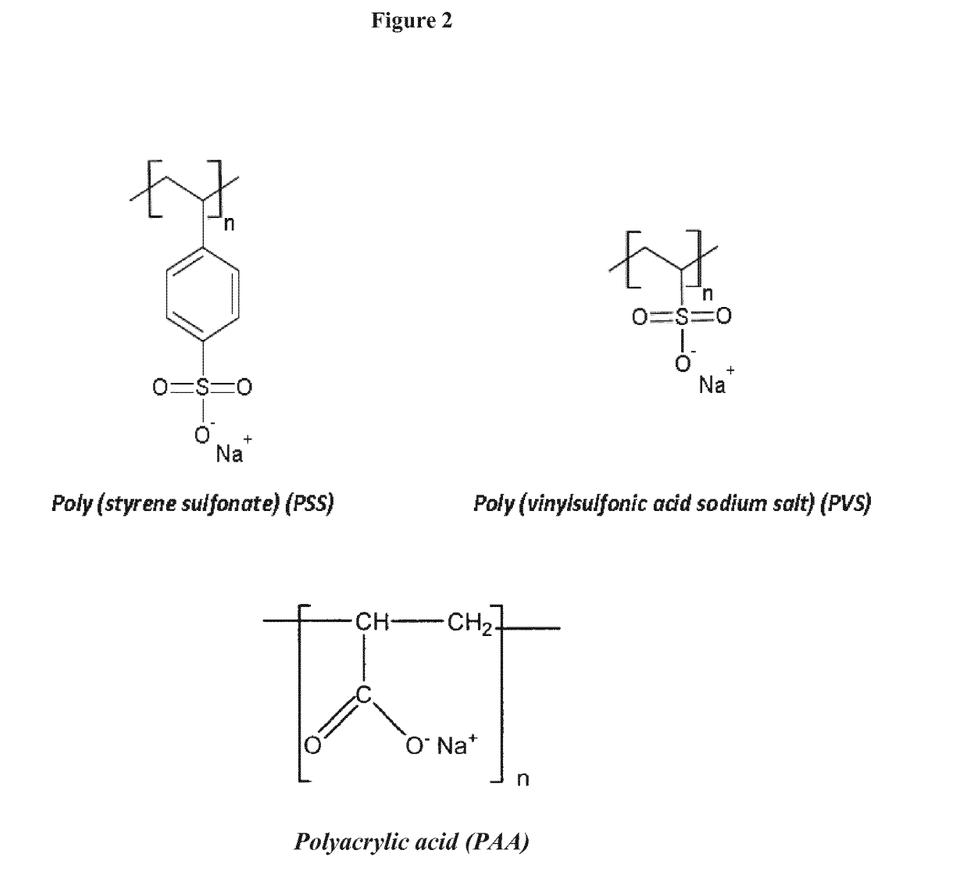
FIG. 2: Shows the molecular structure of polyanions that can be used in present invention, Poly(styrene sulfonate) (PSS), poly(vinylsulfonic acid sodium) (PVS) and poly (acrylic acid) (PAA).

According to a preferred embodiment, the present invention relates to the PEM membrane, wherein the polyanion is selected from the group consisting of poly(styrene sulfonate) (PSS), poly(acrylic acid) (PAA) and poly(vinylsulfonic acid sodium) (PVS), preferably poly(styrene sulfonate). FIG. 2 shows the molecular structure of these polyanions.

Figure 1:
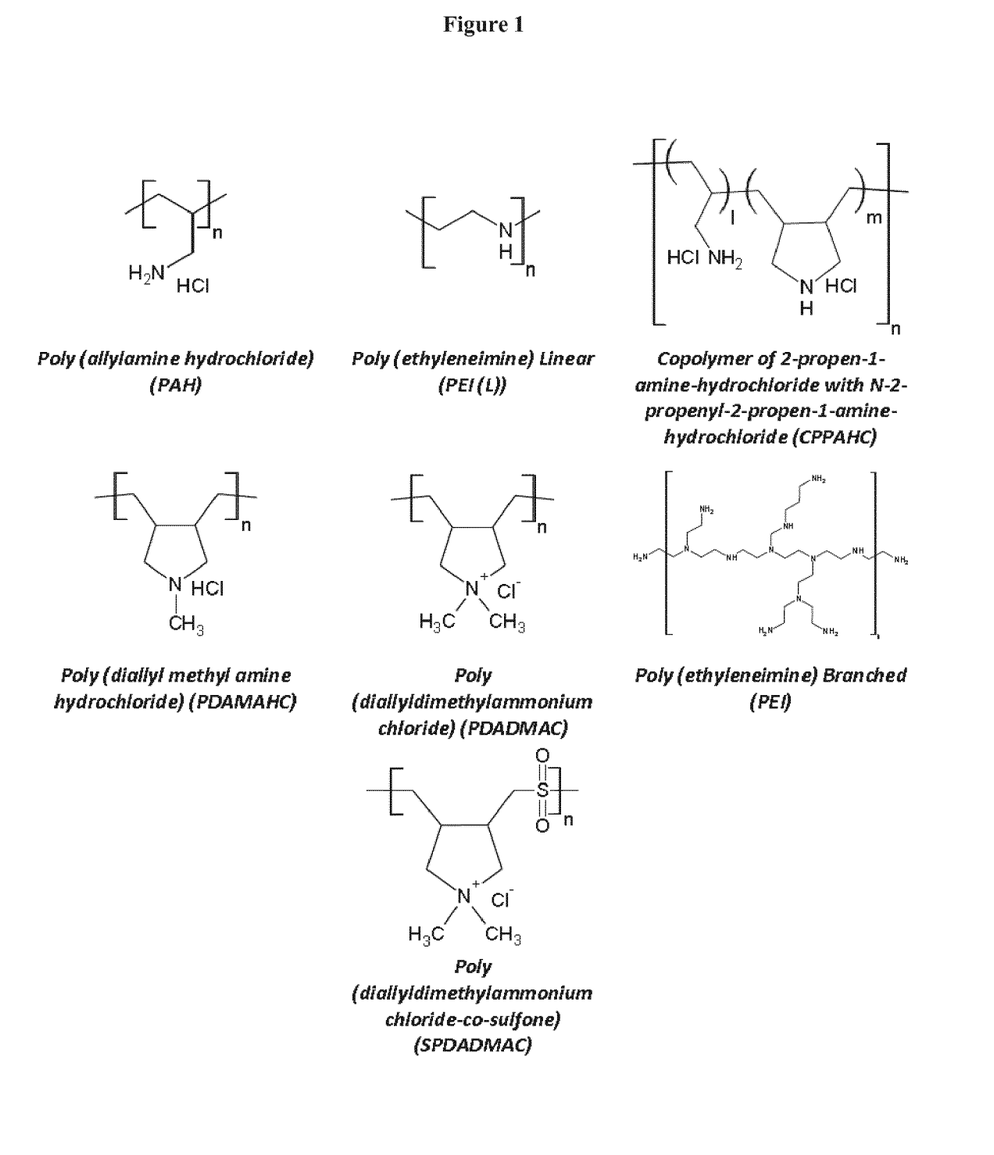
FIG. 1: Shows the molecular structure of the amine based polycations that can be used in present invention, poly (diallyldimethylammonium chloride) (PDADMAC), poly (allylamine hydrochloride) (PAH), poly(ethyleneimine) (PEI), poly(diallyl methyl amine hydrochloride) (PDAMAHC), and a copolymer of 2-propen-1-amine-hydrochloride with N-2-propenyl-2-propen-1-aminehydrochloride (CPPAHC) and the polycation poly(diallyldimethylammonium chloride) with covalently incorporated non-charged moiety, i.e. a sulfone group resulting in poly (diallyldimethylammonium chloride)-co-sulfone (SPDADMAC).

According to yet another preferred embodiment, the present invention relates to the PEM membrane, wherein the polymeric polyanion is comprised of poly(styrene sulfonate) and the polymeric polycation is comprised of poly(diallyldimethylammonium chloride) (PDADMAC), wherein the poly(diallyldimethylammonium chloride) has covalently incorporated sulfone, resulting in poly(diallyldimethylammonium chloride)-co-sulfone (SPDADMAC) (FIG. 1). The SPDADMAC/PSS based membranes show a high potential for the use in (PEM) nanofiltration membranes, also when comparing the membranes to commercial membranes or other studied membranes in literature. Its improved performance compared to other polyelectrolyte combinations can be related to the magnitude of charge compensation within the layer.

According to another preferred embodiment, the present invention relates to the PEM membrane, wherein the membrane multilayer comprises at least two bilayers, preferably at least three bilayers, most preferably at least five bilayers of the polymeric polyanion and the polymeric polycation. The resistance of a PEM membrane performs with increasing amount of bilayers; a linear scaling of the resistance with number of bilayers is observed. The thickness of each layer (polycation or polyanion) that makes up one bilayer is between about 0.1 nm to 10 nm. The thickness of each layer may vary due dependence on the salt concentration during the coating procedure.

According to yet another preferred embodiment, the present invention relates to the PEM membrane, wherein the hydration of the PEM membrane is determined as an increase in membrane thickness of at most 80%, preferably at most 40%, more preferably at most 25%, most preferably at most 10%, when compared to the PEM membrane that was not contacted with liquid. Hydration of the PEM membrane can be defined as the uptake (absorption) of water by the polyelectrolyte multilayer, thereby causing the PEM membrane to swell. The swelling of the polyelectrolyte multilayer results in an increased thickness of the membrane that can be measured using suitable measuring techniques known in the art such as ellipsometry.

According to a preferred embodiment, the present invention relates to the PEM membrane, wherein the membrane multilayer comprises at least 5 mg/m$^2$ of polyelectrolyte, preferably at least 10 mg/m$^2$, most preferably at least 15 mg/m$^2$.

According to yet another preferred embodiment, the present invention relates to the PEM membrane, wherein the membrane has a permselectivity of about at least 5 bar$^{-1}$ and a permeability of about at least 2 L*m$^{-2}$h$^{-1}$bar$^{-1}$. In order to have a good membrane, we want to have a high permeability and low resistance. However, the retention abilities of the membrane are also very important. For instance, a slightly lower permeability with a much higher retention might be better than the highest permeability but with low retention.

According to a preferred embodiment, the present invention relates to the PEM membrane, wherein the membrane is a nanofiltration, microfiltration, ultrafiltration or reverse osmosis membrane, preferably a nanofiltration membrane.

The present invention, according to a second aspect, relates to a filter device comprising at least one PEM membrane of the present invention.

The present invention, according to a third aspect, relates to a method for the production of a PEM membrane of present invention, the method comprising the step of layer-by-layer deposition of a layer of polymeric polyanion followed by deposition of a layer of polymeric polycation, wherein said polymeric polycation or said polymeric polyanion comprises covalent incorporated functional groups, and wherein at least one bilayer, preferably at least two bilayers, most preferably at least five bilayers of polymeric polyanion and polymeric polycation are deposited. To this case, the layer-by-layer (LbL) assembly method of polyelectrolytes was used for the production of hollow fiber NF membranes.

The present invention, according to a further aspect, relates to the use of the PEM membrane of present invention for removal of contaminants from liquids, wherein the liquids is preferably water. Present invention relates to PEM membranes, more specifically hollow fibre nanofiltration PEM membranes that can be used for the filtration of small organic contaminants, such as micropollutants, from a liquids, preferably water. The hollow fibre membranes comprises a thin selective layer based on multilayers of polyelectrolytes. These hollow fibre nanofiltration membranes are being produced via alternatingly dip coating (LbL method) in aqueous polyelectrolyte solutions of positive and negative charge, resulting in polyelectrolyte multilayers (PEM) being formed on the porous membrane surface. The present invention highlights the potential that hollow fibre nanofiltration membranes based on polyelectrolyte multilayers have for the production of safe water.

According to a preferred embodiment, the present invention relates to the the use of the PEM membrane, wherein the contaminants are selected from the group that consist of micro pollutants, salts, chemicals, hormones, pesticides, antibiotics and Endocrine Disrupting Chemicals (EDCs) and mixtures thereof. The PEM membranes of present invention can for example be used for descaling of (drinking) water.

The present invention will be further detailed in the following examples and figures wherein:

In FIG. 8A, the retention results for PDADMAC/PSS are shown, in FIG. 8B the results for SPDADMAC/PSS.

EXAMPLES

Materials

Poly(allylamine hydrochloride) (PAH, Mw 150,000, 40 wt. %); Poly(diallyldimethyl ammonium chloride)-sulfur dioxide copolymer (SPDADMAC, Mw 4,000, 40 wt. %); Copolymer of 2-propen-1-amine-hydrochloride with N-2-propenyl-2-propen-1-amine-hydrochloride (CPPAHC, Mw 100,000, 40 wt. %) and Poly(diallyl methyl amine hydrochloride) (PDAMAHC, Mw 20,000, 50 wt. %) were purchased from Nittobo Medical Co. Poly(ethersulfone) (PES, Ultrason E 6020 P) and Sulfonated poly(ether sulfone) (SPES, Ultrason GM0559/111) were obtained from BASF. Glycerol (EMSURE, 85% Reag. Ph Eur) was obtained from Merck Millipore.

The following chemicals were purchased from Sigma Aldrich and used without further modification. Poly(diallyldimethylammonium chloride) (PDADMAC, Mw 200,000-350,000, 20 wt. %); Polystyrene sulfonate (PSS, Mw~200,000, 30 wt. %); Branched polyethyleneimine (PEI, average Mw~25,000 by LS, average Mn~10,000 by GPC); Linear polyethyleneimine (PEI(L), average Mn 10,000); Poly(vinylsulfonic acid, sodium salt) solution (PVS, 25 wt. %); Sodium chloride (NaCl, BioXtra, ≥99.5%, (AT)); N-Methylpyrrolidine (NMP, 97%); Glycerine (99.5% HP); Magnesium sulfate heptahydrate ($MgSO_4$, ACS≥99.0%); Magnesium chloride hexahydrate ($MgCl_2$, ACS reagent 99.0-102.0%); Sodium sulfate ($Na_2SO_4$, ACS reagent ≥99.0% anhydrous granular); Atenolol (≥98% (TLC)); Bisphenol A; Sulfamethoxazole (VETRANAL); Naproxen.

Polyelectrolyte multilayers were grown on a membrane and its performance was tested by means of permeability, salt retention and micropollutant retention tests on laboratory scale. The systematic approach used in this study gives a detailed insight into the influence of specific polyelectrolytes on multilayer growth and the performance of PEM nanofiltration membranes.

Multilayer Growth of Hollow Fibre NF Membranes Using the LbL Method

Multilayer growth on the hollow fibre membranes was carried out as follows. Membranes were immersed in a polyanion solution (0.1 g·L$^{-1}$, 0.05 M NaCl) for 20 minutes. Thereafter three rinsing steps (5, 10 and 5 minutes respectively) in 0.05 M NaCl were conducted. Then, the membranes were immersed in a polycation solution (0.1 g·L$^{-1}$, 0.05 M NaCl) for 20 minutes and afterwards again rinsed by the three rinsing steps in 0.05 M NaCl. This sequence was repeated for 7 times in order to obtain 7 bilayers. Each time, after the second rinsing step, three membrane samples were removed for characterization purposes. All membrane samples were stored in a glycerol/water mixture (15/85 wt. %) for 4 hours and then dried overnight.

Single PEM coated membrane fibres were potted in a 6 mm diameter module with a fibre length of approximately 165 mm for filtration experiments. Each fibre has an inner diameter of 0.68 mm resulting in a total membrane area of about 3.5·10−4 m2 per module.

Membrane Characterization and Membrane Performance

Figure 3:
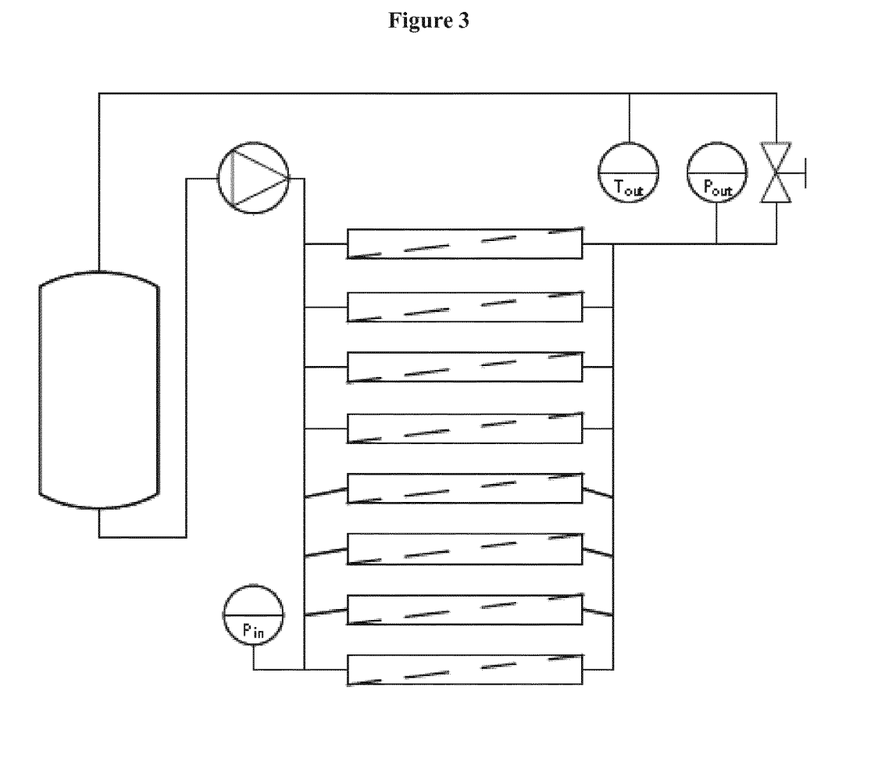
FIG. 3: Shows a schematic representation of the filtration setup. The feed solution was pumped through eight parallel connected membrane modules. The flow and pressure were adjusted by the valve. Transmembrane pressure and temperature were monitored via meters.

The polyelectrolyte systems (polycations/polyanions) studied were: PAH/PSS, PAH/PVS, PDADMAC/PSS, SPDADMAC/PSS, PEI/PSS, CPPAHC/PSS and PDAMAHC/PSS. The pure water flux was measured with DI water in cross-flow mode at a trans-membrane pressure of 2 bar. To measure the salt retention, a cross-flow through the fibres was applied using an in-house build set-up (FIG. 3). The cross-flow velocity of the feed through the fibres was set at 1.0 m·s$^{-1}$. This corresponds to a Reynolds number of approximately 678, which is in the laminar regime. The salt concentration was measured with a WTW cond 3310 conductivity meter. The retention was based on the ratio between the feed and per mate concentrations.

The performance of a membrane used in water filtration is determined by two main factors: water permeability and salt retention. Using equations (1), (2) and (3), the permeability and resistance were determined. For each data point, the average of three different membranes was taken unless stated otherwise. Also for calculating the error bars, the standard deviation between these three different membranes was taken.

The water permeability can be determined by measuring the volumetric flow through the membrane per unit of the membrane area (A), time (t) and applied pressure ($\Delta P$) (equation 1). The permeability is a measure for the ability of the membrane to transport a liquid.

$$Lp = Q/(A*\Delta P) \quad (1)$$

Here Lp is the permeability ($L \cdot m^{-2} \cdot h^{-1} \cdot bar^{-1}$), Q is the volumetric flow ($L \cdot h^{-1}$), A is the membrane area ($m^2$) and $\Delta P$ the applied pressure (bar). The salt retention can be calculated by using equation (2).

$$R = (c_f - c_p/c_f) * 100\% \quad (2)$$

Here R is the retention (%), $c_f$ is the feed concentration ($mg \cdot L^{-1}$) and $c_p$ is the permeate concentration ($mg \cdot L^{-1}$). When the value of R is 100%, complete retention of the solute takes place, whereas with an R-value of 0% both the solute and solvent are passing through the membrane at an equal rate. Besides the retention and permeability, the resistance during filtration is also an important factor characterizing the performance. The resistance can be calculated with equation (3).

$$R = \Delta P/(\mu * J) \quad (3)$$

Here R is the membrane resistance ($m^{-1}$), $\Delta P$ the transmembrane pressure (Pa), $\mu$ the dynamic viscosity (Pa·s) and J the membrane flux ($m \cdot s^{-1}$).

Multilayer Growth of Polyelectrolytes PDADMAC/PSS and SPDADMAC/PSS

It is essential to accurately monitor the growth of the PEM. The hollow fibre geometry has practical limitations to monitor this on the fibre with adequate resolutions. Therefore, the growth of the PEM is studied on model surfaces. Typically these are flat surfaces based on silicon or gold. These surfaces can be primed or chemically pre-treated the unsure a proper growth of the multilayers. On these surfaces, the multilayer growth, thickness, (and thereby also its hydration) can be accurately monitored with techniques like ellipsometry, quart crystal microbalance, atomic force microscopy, or reflectometry. For these studies, reflectometry measurements on silicon wafers were used. These measurements yield the multilayer adsorption in mg/m2.

Figure 4:
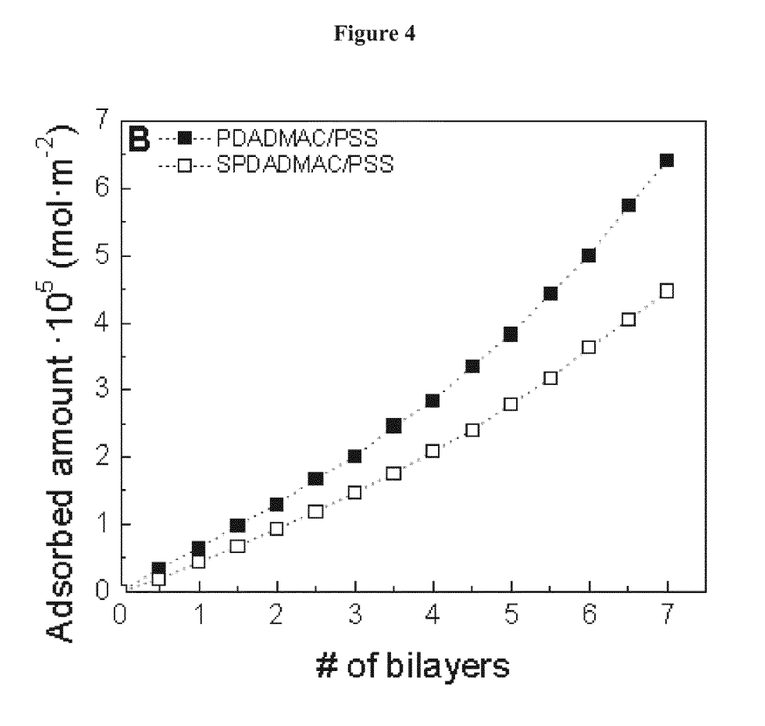
FIG. 4: Shows the multilayer growth of polyelectrolytes PDADMAC/PSS and SPDADMAC/PSS membranes as indicated by the adsorption in moles per square meter. SPDADMAC has a lower molar adsorption than PDADMAC. The lower adsorption of SPDADMAC indicates that per mole PSS, less moles of SPDADMAC compared to PDADMAC are adsorbed. This is also observed when looking at the total amount of moles polyelectrolyte adsorbed.

To be able to compare the two polyelectrolytes in a fair manner, we looked at adsorption in moles instead of masses. For this, the change in mass per adsorption step was calculated and divided by the molar mass of one repeating unit polyelectrolyte to convert to moles. By doing this for each step, alternatingly using the mass for the polycation and polyanion, the increase in moles per layer could be calculated and summing up results in the total adsorbed amount in moles per square meter. The adsorption in moles per square meter for PDADMAC/PSS and SPDADMAC/PSS is shown in FIG. 4 and shows that SPDADMAC has a lower molar adsorption than PDADMAC. The lower adsorption of SPDADMAC indicates that per mole PSS, less moles of SPDADMAC compared to PDADMAC are adsorbed. This is also observed when looking at the total amount of moles polyelectrolyte adsorbed.

PDADMAC is adsorbing 10% more than PSS (measured after 7 layers of polycation respectively polyanion adsorbed), whereas in the case of SPDADMAC/PSS, SPDADMAC is adsorbing 20% less than PSS. This difference could possibly be caused by the lower charge density. From literature it is known that PDADMAC is overcompensating the charge within the layer and therewith after a few bilayers, the charge of the multilayer stays positive, despite the addition of PSS. We conclude that SPDADMAC is not overcompensating as much as PDADMAC is doing and the net charge is less positive, neutral or even negative. This results in a multilayer which is more densely packed because less charges are present and less repulsion takes place, which lead to better retention properties in membrane performance.

Resistance as a Function of Number of Bilayers

After coating the polyelectrolyte multilayers on hollow fibre membranes and potting them into modules, permeability measurements were performed. By measuring the permeate volume over time and applying equation (2), permeability results (in $L \cdot m^{-2} h^{-1} bar^{-1}$) with increasing amount of bilayers were obtained. It is shown that the permeability is decreasing with increasing amount of bilayers with a sudden drop between 2 and 3 bilayers.

Figure 5:
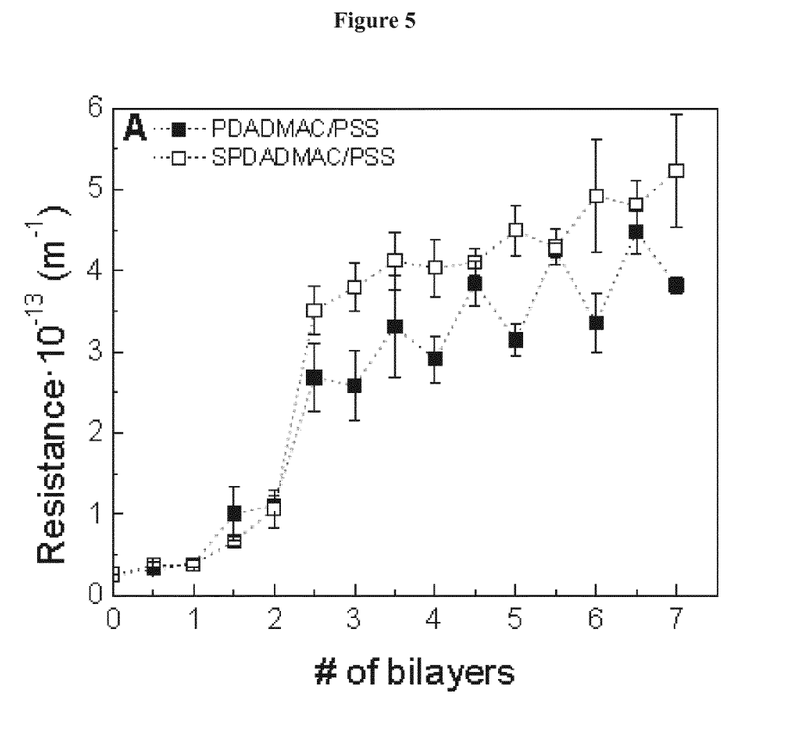
FIG. 5: Shows the resistance of PDADMAC/PSS and SPDADMAC/PSS multilayers as a function of the number of bilayers. A strong increase in resistance is observed between bilayer 2 and 3, i.e. the permeability is decreasing with increasing amount of bilayers, the membrane pores are closing at this number of bilayers. Furthermore, it is observed that SPDADMAC results in a higher resistance and therefore a lower permeability after 7 bilayers than PDADMAC.

The influence of polyelectrolyte on the membrane performance specified as resistance will be studied. With the permeability, also the resistance could be calculated using equation (3). In FIG. 5 the resistance of PDADMAC/PSS and SPDADMAC/PSS multilayers are shown. A strong increase in resistance is observed between bilayer 2 and 3. This means that for these polyelectrolyte combinations the pores are closing at this number of bilayers. Furthermore, it is observed that SPDADMAC results in a higher resistance and therefore a lower permeability after 7 bilayers than PDADMAC (6.9 versus 9.4 $L \cdot m^{-2} h^{-1} bar^{-1}$). PDADMAC/PSS shows a clear odd-even effect, which means that the membrane permeability increases when an additional layer of PDADMAC is coated and decreases when a PSS layer is applied. The higher swelling degree of PDADMAC compared to PSS will results in more open layers with a lower resistance and higher permeability. No clear odd-even effect is shown for SPDADMAC, although a little odd-even effect is observed which is oppositely to the one for PDADMAC. This suggests that SPDADMAC is swelling much less than PDADMAC. Comparing the resistance results, we can conclude that the less adsorbed SPDADMAC layer results in a layer with a higher resistance than PDADMAC, meaning that it is more closely packed than PDADMAC.

PDADMAC/PSS and SPDADMAC/PSS Retention

Figure 6:
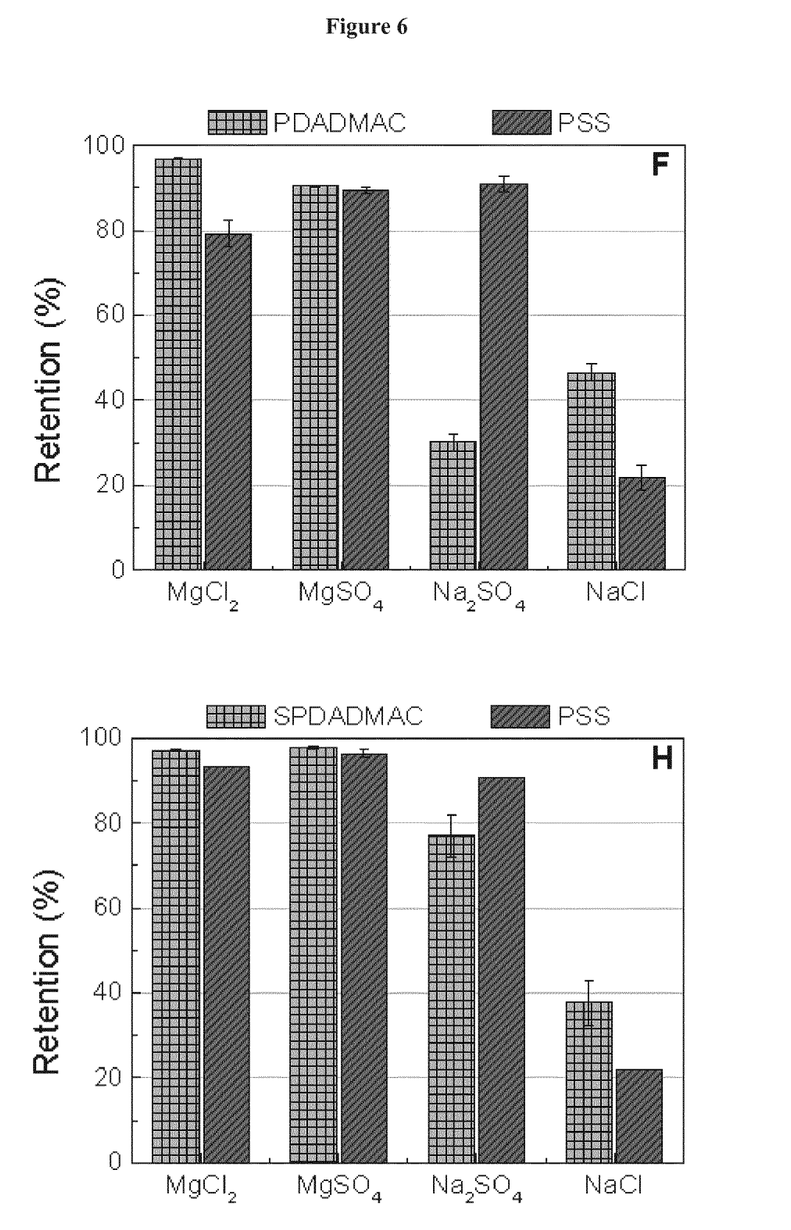
FIG. 6: Shows the PDADMAC/PSS and SPDADMAC/PSS membrane retention performance. Membrane retention experiments were carried out using four different salts; $MgSO_4$, $MgCl_2$, $Na_2SO_4$ and NaCl. The left column bar is the polycation terminated layer (5.5 bilayer) and the right column bar the polyanion terminated layer (6th bilayer). Especially, SPDADMAC/PSS shows a high retention % for both terminating layers (in contrast to PDADMAC/PSS) and so is much less/not dependent on the terminating layer. For SPDADMAC no clear charge based separation mechanism was observed. An extra sulfone group in the polyelectrolyte chain results in a much higher retention, probably caused by a denser configuration of the layers.

In order to study the retention of the membranes, experiments were carried out with salts. Salt retention gives a impression about the quality of the membrane performance. To be able to study the mechanism of separation for the salts, four different salts were studied: MgSO4, MgCl2, Na2SO4 and NaCl. In FIG. 6 the results for salt retention measurements for all the polyelectrolytes are shown. The left column bar is the polycation terminated layer (5.5 bilayer) and the right column bar the polyanion terminated layer (6th bilayer).

Membrane retention of PDADMAC/PSS and SPDADMAC/PSS were compared. Interesting to see is that PDADMAC/PSS already shows some good retention results (depending on the terminating layer, 96.9% for MgCl2, 90.5% MgSO4, 90.9% for Na2SO4 and 46.7% for NaCl) with a clear charged based, or Donnan exclusion mechanism. However, SPDADMAC even shows much better retention results. Especially, SPDADMAC/PSS does show high retention for both terminating layers and so is not dependent on the terminating layer and also does not show a Donnan exclusion mechanism. The retentions obtained for SPDADMAC/PSS were 97.1% for MgCl2, 97.7% for MgSO4, 90.6% for Na2SO4 and 37.7% for NaCl. In the case of SPDADMAC no clear charge based separation mechanism can be observed. Clearly, an extra sulfone group in the polyelectrolyte chain results in a much higher retention, probably caused by a denser configuration of the layers.

Permeability and Permselectivity of PEM Membranes

In order to compare the different PEM membranes, a parameter should be used which is independent on process conditions. This makes is possible to combine permeability and retention results of PEM membranes independently on the thickness of the layer and find the membrane with the best performance. For this purpose, the permselectivity is introduced, which is described as the water permeability over the salt permeability (L/B). Knowing the retention and water permeability and using equation (4), the salt permeability can be calculated. Thereafter the permselectivity for each polyelectrolyte multilayer membrane can be obtained by dividing the water permeability by the salt permeability. Because the thickness of the multilayer is appearing in both the L and B factor, it is disappearing when dividing by each other and not influencing the performance anymore.

$$B = L \cdot \Delta P((100-R)/R) \quad (4)$$

When the permselectivity versus the pure water permeability is plotted (FIG. 7), a classical behaviour is observed; in order to reach a higher selectivity, the water permeability should be lower. With a decrease in water permeability (L), the salt permeability (B) decreases power three times faster and the permselectivity is expected to increase.

Figure 7:
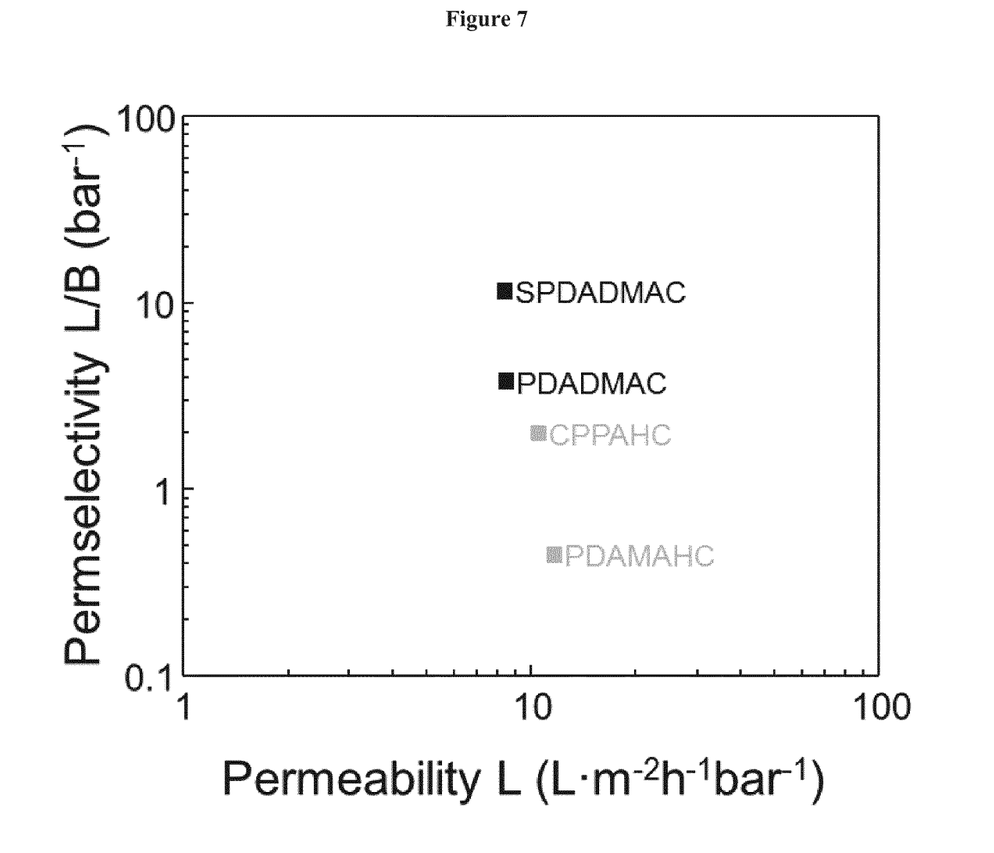
FIG. 7: Shows the differences in permeability and permselectivity of SPDADMAC/PSS and PDADMAC/PSS membranes. In the case of PDADMAC and SPDADMAC, a roughly identical permeability results in a much higher permselectivity for SPDADMAC (about 10 bar-1). This effect can be explained by a lower charge per monomer in the case of SPDADMAC and therefore less overcompensation of charge within the layer and resulting in less swelling. This results in an improvement of the membrane performance without giving up on the permeability.

In the case of PDADMAC and SPDADMAC, a roughly identical permeability results in a much higher permselectivity for SPDADMAC (about 10 bar$^{-1}$). It therefore can be stated that a lower charge per monomer as in the case of SPDADMAC and therewith less overcompensation of charge within the layer and less swelling as observed earlier, results in an improvement of the membrane performance without giving up on the permeability.

Micropollutant Analysis

Figure 8:
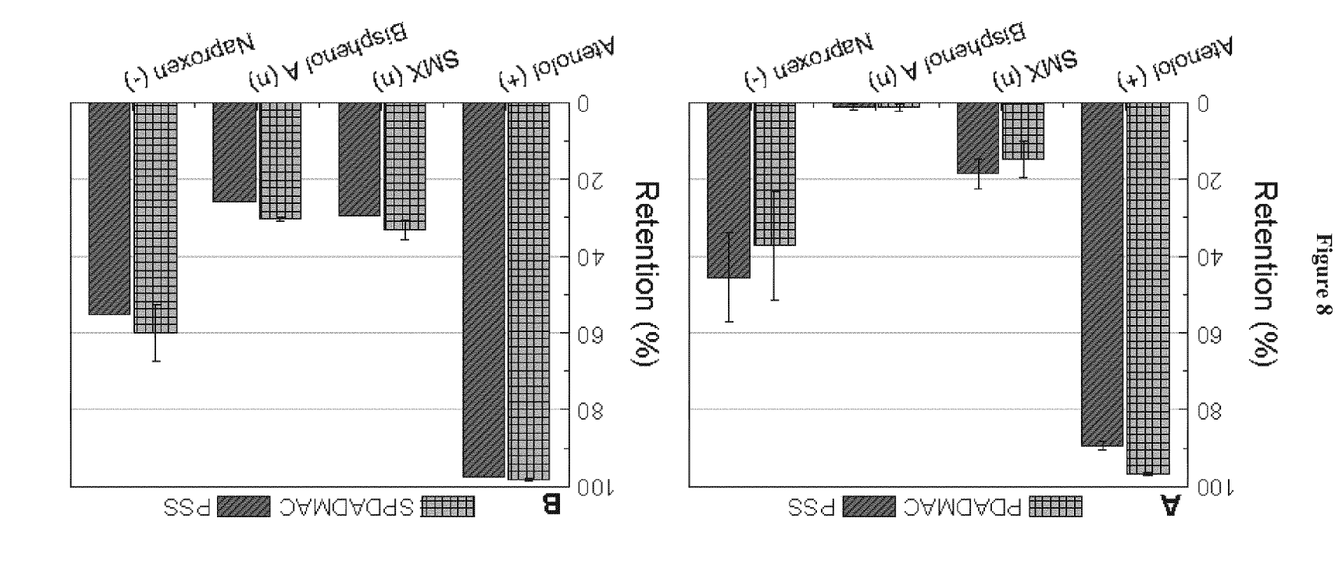
FIG. 8: Shows the potential of membranes for micropollutant removal (retention %). SPDADMAC/PSS and PDADMAC/PSS membranes were tested on retention performance of a selection of four common micropollutants; Atenolol, Bisphenol A, SMX and Naproxen. Filtration measurements are obtained by HPLC.

Next was to investigate the potential of our membranes for micropollutant removal (micropullutant retention). Therefore a selection of membranes was made to test on micropollutant retention. SPDADMAC/PSS and PDADMAC/PSS were tested in order to see if there is a difference in performance between the two membranes. In FIG. 8 the results for the filtration measurements are shown, obtained by HPLC.

For the characterization of the NF membranes on micropollutant removal, a selection of four common micropollutants has been made for retention measurements; Atenolol, Bisphenol A, SMX and Naproxen. The selection is made such that it covers neutral, positive and negative molecules and contains both hydrophilic and hydrophobic molecules (Table 1). In this way the role of the solute charge can be assessed properly. The micropollutant molecular range is between 200 and 300 g·mol−1, which is in the order of the molecular weight cut off of NF membranes.

TABLE 1

Properties of the selected micropollutants for retention measurements.

| | pKa (−) | Log P (−) | Mw (g · mol$^{-1}$) | Charge |
|---|---|---|---|---|
| Atenolol | 9.7 | 0.43 | 266.33 | + |
| Bisphenol A | 10.1 | 4.04 | 228.29 | 0 |
| SMX | 2.0/7.7 | 0.79 | 253.28 | 0/− |
| Naproxen | 4.2 | 2.99 | 230.26 | − |

Solutions containing 10 mg·L$^{-1}$ of micropollutant where filtrated through the prepared membranes for 24 hours before collecting the permeate sample. This time was needed in order to ensure steady state retentions. During filtration a cross-flow velocity of 1 m·s$^{-1}$ was applied and a transmembrane pressure of 2.3 bar. The micropollutant retentions were calculated based on the difference between permeate and concentrate concentrations. For this, the concentrations were determined by means of high pressure liquid chromatography (HPLC). A Dionex Ultimate 3000 U-HPLC system equipped with a RS variable wavelength detector was used. Micropollutant separation was performed on an Acclaim RSLC C18 2.2 mm column (Thermo Scientific) at 40° C., while applying a gradient flow from 95 wt. % H$_2$O+5 wt. % acetonitrile at pH 2 to 5 wt. % H$_2$O+95 wt. % acetonitrile at 1 mL·min$^{-1}$.

In FIG. 8A, the retention results for PDADMAC/PSS are shown, in FIG. 8B the results for SPDADMAC/PSS. In general, atenolol is retained the highest in the membranes, naproxen is the second highest retained, followed by SMX and Bisphenol A. Micropollutant retention of SPDADMAC/PSS PEM membranes represented in FIG. 8B is increased as compared to the PDADMAC/PSS in FIG. 8A. The positive terminating layer (SPDADMAC), results for each micropollutant in a higher retention. This is attributed to the odd-even effect of SPDADMAC in combination with PSS, where in general terminating with SPDADMAC results in a lower permeation and terminating with PSS in a higher permeation. This is a result of the lower swelling degree of SPDADMAC compared to PSS and therewith denser structure which results in a higher retention. For SPDADMAC/PSS high retention to atenolol is observed (98.2%), and average retention for naproxen (59.9%). The neutral compounds are retained in lowest amount, namely 33.1% for SMX and 30.3% for Bisphenol A. Especially the latter, neutral compounds show much higher retention with SPDACMAC/PSS than the retention with PDADMAC/PSS. Therefore it can be said that SPDADMAC/PSS is retaining micropollutants much better than PDADMAC/PSS, which was expected because also the performance as indicated with permselectivity, was higher for PDADMAC than for SPDADMAC.

The invention claimed is:

1. A polyelectrolyte multilayer (PEM) membrane for the filtration of liquids, wherein the membrane is comprised of at least one bilayer, wherein the at least one bilayer is comprised of a layer of a polymeric polycation and a layer of a polymeric polyanion, wherein linked to the backbone of the polycation are functional non-charged groups that do not dissociate in water, wherein hydration of the PEM membrane when contacted with the liquids is reduced through covalent incorporation of functional groups in said polymeric polycation or in said polymeric polyanion, in comparison to a PEM membrane that does not comprise incorporation of functional groups in said polymeric polycation or said polymeric polyanion, wherein the functional groups are selected from the group consisting of sulfone, vinylpyrrolidone, and styrene, wherein the polycation is an amine based polycation selected from the group consisting of poly(diallyldimethylammonium chloride) (PDADMAC), Poly(acrylamide-co-diallyldimethylammonium chloride) (PDADMAC/AM), poly(allylamine hydrochloride) (PAH), poly(ethyleneimine) (PEI), poly(diallyl methyl amine hydrochloride) (PDAMAHC), and a copolymer of 2-propen-1-amine-hydrochloride with N-2-propenyl-2-propen-1-aminehydrochloride (CPPAHC), and wherein the polyanion is selected from the group consisting of poly(styrene sulfonate) (PSS), poly(acrylic acid) (PAA) and poly(vinylsulfonic acid sodium) (PVS).

2. The polyelectrolyte multilayer (PEM) membrane according to claim 1, wherein the polymeric polyanion is comprised of poly(styrene sulfonate) and the polymeric polycation is comprised of poly(diallyldimethylammonium chloride), wherein the poly(diallyldimethylammonium chloride) has covalently incorporated sulfone, resulting in poly (diallyldimethylammonium chloride)-co-sulfone (SPDAD-MAC).

3. The polyelectrolyte multilayer (PEM) membrane according to claim 1, wherein the membrane multilayer comprises at least two bilayers.

4. The polyelectrolyte multilayer (PEM) membrane according to claim 1, wherein the hydration of the PEM membrane is determined as an increase in membrane thickness of at most 80%, when compared to the PEM membrane that was not contacted with liquid.

5. The polyelectrolyte multilayer (PEM) membrane according to claim 1, wherein the membrane multilayer comprises at least 5 mg/m$^2$ of polyelectrolyte.

6. The polyelectrolyte multilayer (PEM) membrane according to claim 1, wherein the membrane has a permselectivity of about at least 5 bar$^{-1}$.

7. The polyelectrolyte multilayer (PEM) membrane according to claim 1, wherein the membrane has and a permeability of about at least 2 L*m$^{-2}$h$^{-1}$bar$^{-1}$.

8. The polyelectrolyte multilayer (PEM) membrane according to claim 1, wherein the membrane is a nanofiltration, microfiltration, ultrafiltration or reverse osmosis membrane.

9. A filter device comprising at least one polyelectrolyte multilayer (PEM) membrane according to claim 1.

10. A method for the production of a polyelectrolyte multilayer (PEM) membrane of claim 1, the method comprising the step of layer-by-layer deposition of a layer of polymeric polyanion followed by deposition of a layer of polymeric polycation, wherein said polymeric polycation or said polymeric polyanion comprises covalent incorporated functional groups, and wherein at least one bilayer of polymeric polyanion and polymeric polycation are deposited.

11. A method comprising using a polyelectrolyte multilayer (PEM) membrane of claim 1 for removal of contaminants from liquids, comprising the step of filtering liquids by contacting said liquids with said PEM membrane.

12. The method according to claim 11, wherein the contaminants are selected from the group that consist of micro pollutants, salts, chemicals, hormones, pesticides, antibiotics and Endocrine Disrupting Chemicals (EDCs) and mixtures thereof.

13. The polyelectrolyte multilayer (PEM) membrane according to claim 1, wherein the functional groups are sulfone groups.

14. The polyelectrolyte multilayer (PEM) membrane according to claim 1, wherein the functional groups are vinylpyrrolidone groups.

15. The polyelectrolyte multilayer (PEM) membrane according to claim 1, wherein the functional groups are styrene groups.

16. The polyelectrolyte multilayer (PEM) membrane according to claim 1, wherein the hydration of the PEM membrane is determined as an increase in membrane thickness of at most 40% when compared to the PEM membrane that was not contacted with liquid.

17. The polyelectrolyte multilayer (PEM) membrane according to claim 1, wherein the hydration of the PEM membrane is determined as an increase in membrane thickness of at most 25% when compared to the PEM membrane that was not contacted with liquid.

18. The polyelectrolyte multilayer (PEM) membrane according to claim 1, wherein the hydration of the PEM membrane is determined as an increase in membrane thickness of at most 10% when compared to the PEM membrane that was not contacted with liquid.

19. The polyelectrolyte multilayer (PEM) membrane according to claim 1, wherein the membrane is a nanofiltration membrane.

20. The polyelectrolyte multilayer (PEM) membrane according to claim 1, wherein the membrane multilayer comprises at least three bilayers.

* * * * *